United States Patent [19]
Johnson

[11] 4,291,445
[45] Sep. 29, 1981

[54] ROTARY CUTTING BLADE ASSEMBLY

[75] Inventor: Morris V. Johnson, Lima, Ohio

[73] Assignee: National-Standard Company, Niles, Mich.

[21] Appl. No.: 127,644

[22] Filed: Mar. 6, 1980

[51] Int. Cl.³ .................. B23D 71/00; B27G 13/00; B26D 1/12

[52] U.S. Cl. ............................ 29/78; 144/218; 407/48; 407/61

[58] Field of Search .................. 29/78, 79; 144/218, 144/230, 231, 233; 407/48, 51, 55, 56, 58, 61

[56] References Cited

U.S. PATENT DOCUMENTS

| | | | |
|---|---|---|---|
| 1,514,709 | 11/1924 | Lyon | 407/51 |
| 2,265,643 | 12/1941 | Heath | 29/78 |
| 2,398,763 | 4/1946 | Bagne | 407/61 |
| 2,899,992 | 8/1959 | Key | 144/218 |
| 2,980,985 | 4/1961 | Paquin | 407/58 |
| 3,447,578 | 6/1969 | Mitten | 144/218 |
| 3,887,975 | 10/1975 | Sorice et al. | 407/51 |
| 3,946,474 | 3/1976 | Hahn et al. | 407/58 |
| 4,074,737 | 2/1978 | Stewart | 407/51 |
| 4,151,869 | 5/1979 | Halloran et al. | 144/230 |
| 4,209,047 | 6/1980 | Weill | 407/48 |

Primary Examiner—Harrison L. Hinson
Attorney, Agent, or Firm—Emrich, Root, Lee, Brown & Hill

[57] ABSTRACT

A rotary cutting blade assembly for removing rubber tread material from a pneumatic tire carcass prior to texturizing and finishing the tire carcass for retreading includes a cutting wheel rotatably mounted on an arbor. The cutting wheel includes a plurality of pockets adapted to receive and mount a plurality of cutting blades, which blades present an angular cutting edge which engages the tread material on the tire carcass substantially parallel to the carcass to slice and to remove the tread material from the carcass.

7 Claims, 9 Drawing Figures

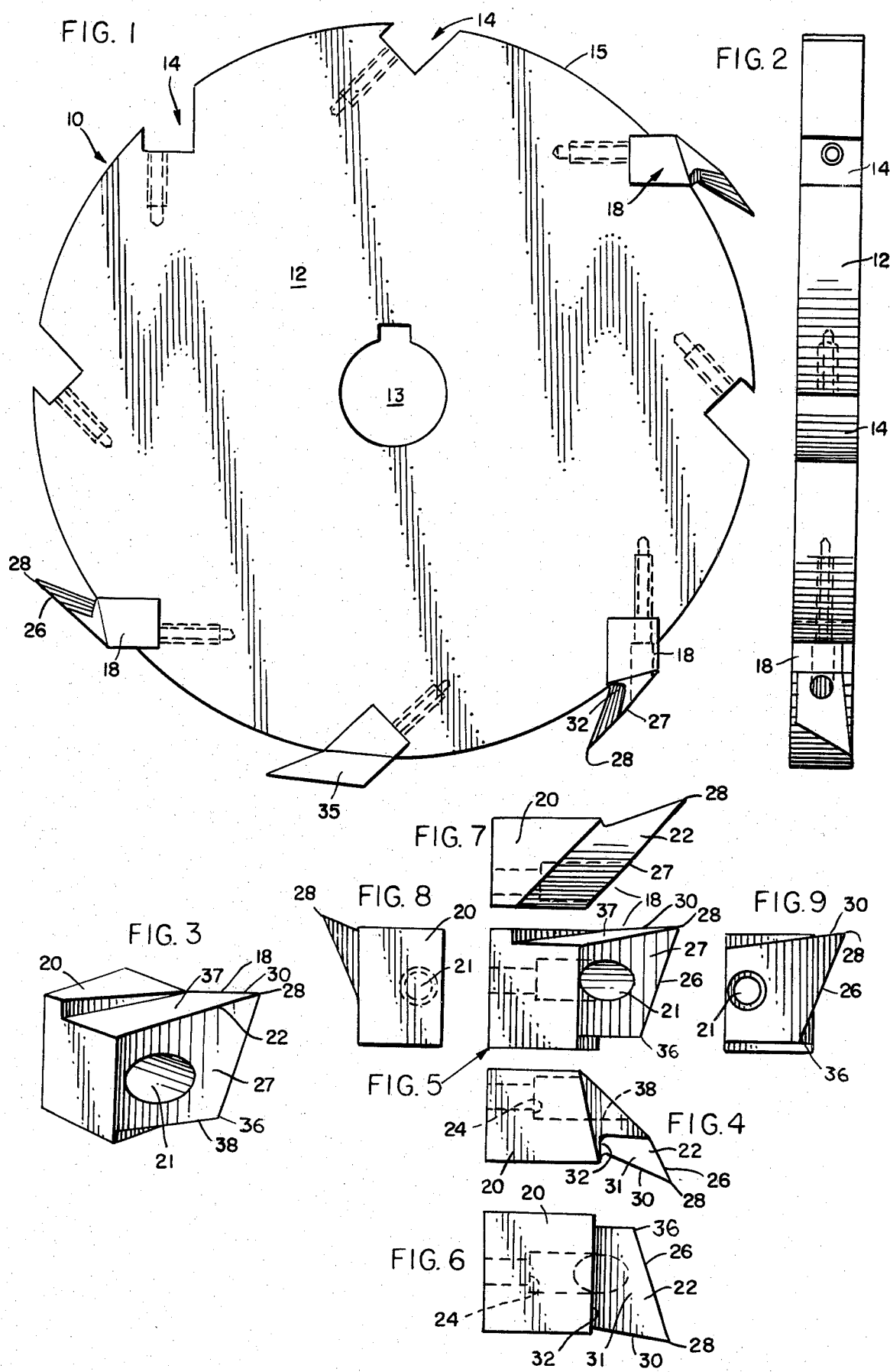

ROTARY CUTTING BLADE ASSEMBLY

BACKGROUND OF THE INVENTION

Apparatus relating to preparation of worn tire casings for subsequent retreading or recapping operations have been widely developed and utilized in the retreading industry. The removal of lugs and rubber tread material from pneumatic tire casings is a well known procedure and is generally described by the term as "buffing". The term "buffing" has been used to identify the removal of old rubber from the tire carcass whether it is done by rough cutting wheels, texturizing wheels or finishing wheels.

The predominant manner of performing the operation of buffing is generally accomplished by abrading the periphery of the tire carcass with an abrading member which may be in the form of a rotating buffing wheel having rasp-like teeth on its peripheral surface, or a rotating buffing wheel having abrasive materials mounted thereon or a rotating buffing wheel having a plurality of circular chippers or cutting elements mounted thereon which chip away to remove the rubber tread material from the tire carcass of casing.

However, the primary problem encountered with buffing wheels having rasp-like teeth and coarse abrasives mounted thereon is that considerable heat is produced which results in the production of smoke and vapors during the buffing operation. Also, such buffing wheels produce large volumes of rubber dust particles which create a health hazard for workers in the area of operation. To overcome such difficulties, complex and expensive dust collecting and heat removal equipment are necessary to remove such contaminants from the work area. See for example, U.S. Pat. No. 3,711,909 which relates to rasp-like abrading wheels and U.S. Pat. Nos. 3,742,655 and 3,918,217 relating to abrading wheels having coarse abrasives or protrusions mounted to the periphery thereof.

It has also been suggested to mount hardened circular cutting inserts onto the rotating buffing wheel to thereby chip the tread material from the tire carcass to somehow overcome the problem of dust and heat that are prevelent with the rasp-like and abrading-type buffing wheels. Also, such devices, as shown in U.S. Pat. Nos. 3,888,145, 3,953,915 and 3,604,084, have been designed to provide a rotary detreading wheel having a plurality of circular cutting elements mounted therein which may be indexed and realigned to provide a new cutting edge when a portion of the cutting insert has become dulled during usage. Additionally, such devices have been designed to be bidirectional to provide a cutting action depending upon the rotation of the buffing wheel. Because, such devices are complex and expensive to manufacture, are difficult to maintain in operating conditions and often become clogged due to the removal of rubber from the buffed tire carcass, they have not found wide-spread application and adaption by the industry.

SUMMARY OF THE INVENTION

One object of the present invention is to provide a rotating cutting blade assembly for removing tread material from a tire carcass by slicing the rubber tread material into small strips to thereby substantially eliminate dust problems that overcome the formation of heat and smoke during the buffing operation.

It is another object of the present invention to provide a rotating cutting blade assembly for slicing rubber tread material from a tire carcass which is self-cleaning.

It is still another object of the present invention to provide a rotating cutting blade assembly for slicing plastic and wood materials.

It is a further object of the present invention to provide a rotating cutting blade assembly having a plurality of cutting blades extending outwardly from the wheel assembly and presenting alternately left handed and right handed cutting agents that engages the tread material on the tire carcass substantially parallel to the surface radius thereof.

The rotary cutting blade assembly of the present invention includes a wheel having a plurality of pockets equally spaced around its outer surface. Each pocket is adapted to receive and hold a cutting blade member which is comprised of a base portion and a blade projection portion extending outwardly from the base portion. The base portion is adapted to be retained in the pockets of the circular wheel by fastening means. The blade structure of the cutter member presents a plurality of cutting surfaces having a trapezoidal-like configuration to present an angular or guillotine-like major cutting or slicing edge, substantially along the leading edge thereof. The cutting face of the blade projection is substantially parallel to the surface radius of the rubber tread material on the tire carcass during the slicing action of the blade during the buffing or detreading operation. The cutter blade members are designed to be both left handed and right handed faced and are alternately spaced about the rotating cutter wheels when the wheel rotates on an axis substantially within the plane of the axis of rotation of the tire casing. Such a structure provides the capability of a back and forth slicing action on the tire casing to provide a substantially uniform removal of the rubber tread material from the tire carcass.

The rotating cutting blade assembly of the present invention has particular applicability in the tire buffing apparatus described in U.S. Pat. No. 4,116,256 and assigned to the assignee of the present invention. The delugging blade wheel assembly may be utilized as the rough cutting wheel, in the referred to tire buffing apparatus, which is rotatably mounted on a housing with the axis of rotation substantially within the plane of the axis of rotation of the tire casing. Also, the present invention has applicability in buffing apparatus wherein the arbor is rotating on an axis substantially perpendicular to the plane of the axis of rotation of the tire casing.

As is well known in the art, the unique cutter blade structure of the present invention may be composed of boride carbide steel, tungsten carbide or specially treated alloy to provide slicing edges having superior hardness and toughness to thereby provide increased wear life of the cutting edges. Additionally, the concave-like surface extending rearwardly from the guillotine-like cutting edge to the base portion of the cutter member permits the rapid removal of the sliced rubber tread material from the tire carcass and thereby prevents build-up and clogging of the rotary cutting blade assembly during the buffing operation.

BRIEF DESCRIPTION OF THE DRAWINGS

FIG. 1 is a side elevational view of a cutter blade wheel assembly in accordance with the principles of the present invention;

FIG. 2 is an end view of the cutter blade wheel assembly in accordance with the present invention;

FIG. 3 is a perspective enlarged view of the cutter blade in accordance with the present invention;

FIG. 4 is a side elevation view of the cutter blade in accordance with the present invention;

FIG. 5 is a top elevational view of the cutter blade in accordance with the present invention;

FIG. 6 is a bottom elevational view of the cutter blade in accordance with the present invention;

FIG. 7 is a side elevational view of the cutter blade in accordance with the present invention;

FIG. 8 is an end view of the cutter blade in accordance with the present invention; and FIG. 9 is an end view of the cutter blade in accordance with the present invention.

DETAILED DESCRIPTION

Referring now to the drawings, wherein like numerals have been used throughout the several views to designate the same or similar parts, in FIGS. 1 and 2 a rotary cutting blade assembly 10 includes wheel means 12 having a plurality of pockets 14 equally spaced around the outer annular surface 15 of the wheel. Each pocket 14 is adapted to receive and hold a cutting blade member or element 18, as will hereinafter be described. The wheel 12 includes a bore 13 for mounting upon a rotating arbor (not shown).

As shown in FIGS. 3-9, the cutting blade member or element 18 is comprised of a base portion 20 and a blade projection portion 22 extending forwardly and outwardly from the base portion. The base portion 20 and projection portion 22 includes a bore 21 having a shoulder 24 thereon which permits mounting of the base portion into the pockets 14 of the wheel 12 by fastening means (not shown). The blade projection portion 22 provides a major angular or guillotine-like cutting edge 26 substantially along the leading edge thereof. The face 27 of the blade projection portion 22 is substantially trapezoidal in structural configuration and is substantially parallel to the surface of the material on the work piece (not shown) during the slicing action of the rotary cutting blade assembly. The face has proper clearance angle immediately adjacent to edge 26 to cause minimal rubbing, hence only slight heat generation. Also surfaces 37 and 38 are properly relieved to preclude heat and cutting interferance. Point 36 of straight cutting edge 26 is extended in such a manner that all points along 26 are nearly equal radius from center of blade assembly 10. Extending rearwardly from the leading corner edge 28 is a secondary cutting edge 30 which is substantially perpendicular to the radius surface of the sliced material during operation of the rotary cutting blade assembly. As shown in FIGS. 4 and 6, the side 31 opposite the face 27 of the blade projection portion 22 presents a properly raked concave-like surface 32 which permits the sliced rubber tread material to be directed away from the area of the pocket 14 and the base portion 20 of the cutting blade member 18 to provide a rotary cutting blade assembly which is substantially self-cleaning during the buffing operation.

When the rotary cutting blade assembly 10 is utilized as a rough cutting wheel in the tire buffing apparatus, as described in U.S. Pat. No. 4,116,256, the rotary cutting blade assembly is mounted on a housing with the axis of rotation substantially within the plane of the axis of rotation of the tire casing. During such a buffing operation, the rotating blade assembly 10 and face 27 thereof is substantially parallel to the radius of the tire casing during the cutting and buffing operation. During such an operation, it is desired that the cutting blade members 18 be both left handed and right handed faced and alternately spaced about the rotary wheel 12. In such an instance, the cutting blade member (not shown) would be a mirror image of the cutting blade member 18, as shown in FIGS. 3-9, and is shown broadly as cutting blade member or element 35 in FIG. 1. The use of left handed and right handed cutting blade members 18 and 35 permits the operator of the buffing apparatus to engage the rotary cutting blade assembly 10 in a back and forth operation against the tread material on the tire casing.

If it is desired to utilize the rotary cutting blade assembly 10 in a buffing apparatus wherein the cutting blade assembly is mounted on a housing or arbor with the axis of rotation perpendicular to the plane of the axis of rotation of the tire casing, it is only necessary that single type cutting blade member 18 be utilized because the cutting action is in one direction.

As is appreciated in the above discussion, the unique rotary cutting blade assembly 10 of the present invention has applicability and use in mounting on any rotating arbor. Accordingly, plastics, wood and other type materials may be cut and sliced from a workpiece utilizing the present invention with the same results that is obtained when used for the removal of rubber tread material from tire casings.

Also, during removal of tread material from a tire casing minimum sliced action approximates 85% of the cutting and that the sliced rubber from the casing may be between a fraction of an inch and over one inch in depth and between about two to five inches in length.

The cutting blade member 18, is preferably, a castible material having boride or tungsten steel treatments or high temperature and hardness alloys to provide hardness and toughness to the major and secondary cutting edges to provide increased wear life of the cutting edges, as is well known in the art. Additionally, as shown in FIGS. 1-9, the base portion 20 and pockets 14 are preferably rectilinear in shape to permit indexing and fixedly mounting of the blade member to the wheel means 12. However, it is within the scope of the present invention to include any shape of the base portion which may be indexed and fixedly mounted to the wheel means.

I claim:

1. A cutting blade assembly for mounting to a rotating arbor for slicing material from a workpiece, including in combination:

wheel means having a plurality of pockets equally spaced about the outer annular surface thereof, said wheel means including a bore therein for mounting to the rotating arbor, a plurality of cutting blade members each comprised of a base portion and a blade projection portion, said blade projection portion extending forwardly and outwardly from said base portion, said blade projection portion including a primary cutting edge extending radially along the leading surface of said blade projection portion to provide a guillotine-like cutting edge, and a secondary cutting edge extending rearwardly from the outward corner of said primary cutting edge with said base portion being adapted to be fixedly mounted in said pocket in said wheel means to complete the blade assembly.

2. The cutting blade assembly in accordance with claim 1 wherein said blade projection portion includes a face thereupon the radially outermost extremity, said face being substantially planar and oriented tangentially to the radius of rotation of said cutting blades mounted on said wheels.

3. The cutting blade assembly in accordance with claim 2 wherein said face has a substantially trapezoidal configuration.

4. A cutting blade assembly for mounting to a rotating arbor for slicing tread rubber from a tire casing, including in combination:
   wheel means having a plurality of pockets equally spaced about the outer annular surface thereof, said wheel means including a bore therein for mounting to the rotating arbor,
   a plurality of cutting blade members each comprised of a base portion and a blade projection portion, said blade projection portion extending forwardly and outwardly from said base portion, said blade projection portion includes a primary cutting edge extending radially outward along the leading edge of said blade projection portion to provide a guillotine-like cutting edge, and a secondary cutting edge extending rearwardly from the corner of said primary cutting edge; said base portion being adapted to be fixedly mounted in said pocket in said wheel means.

5. The cutting blade assembly in accordance with claim 4 wherein said secondary cutting edge is substantially axially perpendicular to the radius of rotation of said cutting blade mounted on said wheel.

6. The cutting blade assembly in accordance with claim 4 further including a plurality of second cutting blade members each being the mirror image of said cutting blade members, with said equally spaced pockets on said wheel means being adapted to receive and mount sequentially about the annular surface thereof said cutting blade members and said second cutting blade members to permit the back and forth slicing of rubber tread material from the tire casing.

7. The cutting blade assembly in accordance with claim 4 wherein the slicing action occurs substantially along the entire length of said major cutting edge.

* * * * *